Nov. 24, 1942.   D. F. EGGER   2,303,114

SEALING DEVICE

Filed March 18, 1941

INVENTOR,
DANIEL F. EGGER.
BY
*Lippincott & Metcalf*
ATTORNEYS.

Patented Nov. 24, 1942

2,303,114

UNITED STATES PATENT OFFICE 2,303,114

SEALING DEVICE

Daniel F. Egger, Inglewood, Calif., assignor to Northrop Aircraft, Inc., Hawthorne, Calif., a corporation of California Application March 18, 1941, Serial No. 383,938

12 Claims. (Cl. 285—130)

My invention relates to pressure seals and more particularly to a seal having no organic material therein, and which therefore will stand high temperatures, as well as remaining tight under high pressure.

Among the objects of my invention are to provide a high pressure seal that will operate at high temperatures; to provide an all-metal seal, and to provide a seal between parts that can be used in devices having high pressures and temperatures such as for example, the gas turbine, described and claimed by John K. Northrop and Vladimir H. Pavlecka, Serial No. 403,338, filed July 21, 1941, wherein the present seal is utilized.

Other objects of my invention will be apparent or will be specifically pointed out in the description forming a part of this specification, but I do not limit myself to the embodiment of the invention herein described, as various forms may be adopted within the scope of the claims.

Figure 1:
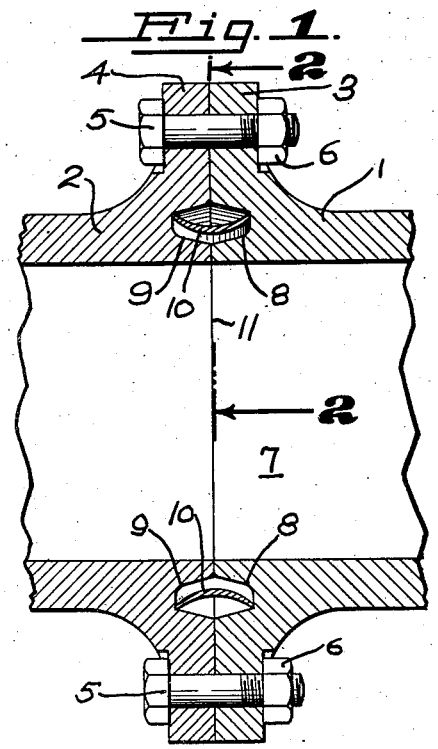
Fig. 1 is a view partly in section and partly in elevation of a conduit having a joint therein sealed by the device of my invention.
Figure 2:
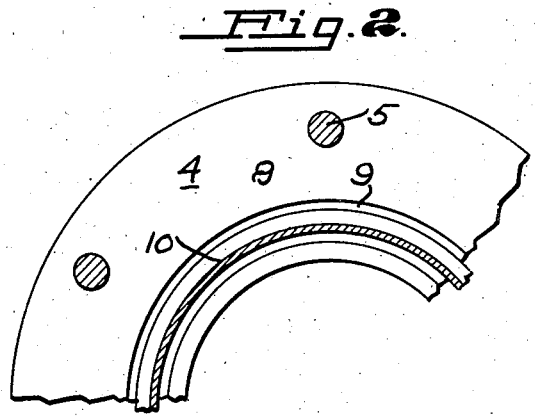
Fig. 2 is a view partly in cross-section and partly in elevation, taken as indicated by the line 2—2 in Fig. 1.

The figures are conventionalized and the conduit is simply used to indicate the manner in which the seal can be used in any joint, irrespective of the type of conduit.

In the application of Northrop and Pavlecka as cited above, it is necessary that the device shown, described and claimed therein, namely, a gas turbine, have one or more joints that must be sealed from leakage of any sort.

The gas turbine operates at relatively high temperatures and at high pressures and consequently no material other than metallic could be used in its conduit joints to stop leakage therethrough. Consequently, it is necessary to utilize an all-metal seal in gas turbine plant conduit joints, which will not only be completely immune to attack of either heat or high temperature, but which will actually exercise the forces induced in the seal by the fluid pressure toward a more effective leak proofness.

The present seal has been found satisfactory for these purposes and broadly comprises a peripheral chamber extending around the conduit on both sides of a joint in conduit flanges, together with an annular elastic metal seal located in the chamber. The elastic seal is of course made into a ring, by welding for example, and its cross-section is convex toward the source of pressure, usually the inside of the conduit. The sealing ring bridges across the joint, and the edges thereof bear against the peripheral corners of the chamber. Consequently, when pressure is exerted from within the conduit against the convex surface of the sealing ring, the convex cross-section of the latter tends to straighten out, and the edges thereof are forced tightly against the peripheral corners of the seal chamber. The higher the pressure within the conduit, the more the profile of the sealing ring tends to straighten out, and the greater force is exerted on the peripheral edges of the sealing ring on the corners of the seal chamber, thus increasing the bearing stress on these edges. The increased bearing stress produces a greater elastic deformation of the edges of the seal in the peripheral corners of the chamber, thereby suppressing leakage of the fluid under pressure.

My invention may be more fully understood by direct reference to the drawing, which is a conventionalized view of a conduit having a flanged joint. Two conduit portions 1 and 2 are provided with lateral flanges 3 and 4 respectively. The mating faces of the flanges are preferably machined or ground, and are held together in mutual tight contact by bolts 5 and nuts 6, thus forming a continuous internal conduit passageway 7. Cut into the flanges 3 and 4 and spaced a small distance away from the inner wall of the conduit, is a seal chamber comprising two mating annular grooves 8 and 9, in which a metal sealing ring 10 is mounted. Each of these grooves has two surfaces meeting to form an annular or peripheral corner 10'. Sealing ring 10 is peripherally continuous, being formed either from cylindrical stock or from profiled strips as by welding, and is inwardly curved to present a convex surface to the interior of the conduit 7. The profile of the peripheral sealing ring 10 is defined by area between two circular arcs, one of larger radius and one of smaller radius than the mean radius of the curved profile. The edges of the sealing ring profile are mutually parallel, sharply rounded by radii tangent to the circular arcs of the profile and the whole sealing ring is smoothly machined. For proper functioning of the sealing ring it is essential that the stresses on its edges be as light as is consistent with the strength of materials used in the sealing ring and in the flanges of the conduits. To this end the sealing ring is assembled into the sealing chamber with a definite amount of preload by making the sealing ring profile of greater convexity in free state and by forcing the ring into a deformed slope at assembly simply by making the inner walls 12 and 13 of the sealing chamber conical and of larger maximum diameter than the free diameter of the sealing ring edges. Therefore, at assembly the sharply rounded peripheral edges of the sealing ring press into the peripheral corners of the sealing chamber and seal to a limited extent even without the presence of fluid pressure.

Figure 3:
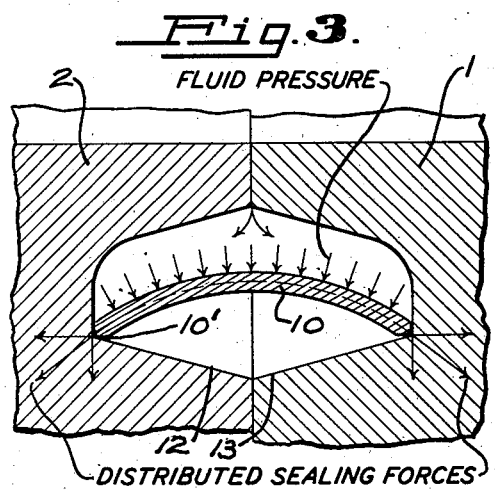
Fig. 3 is an enlargement of the cross-section of an elastic sealing ring having a constant profile thickness.
Figure 4:
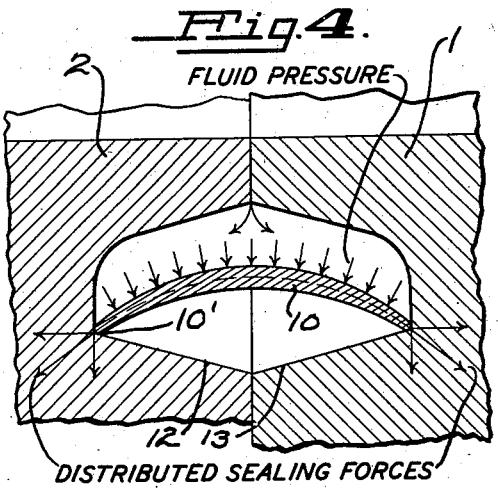
Fig. 4 is an enlargement of the cross-section of the specific elastic sealing ring having a profile of decreasing thickness from its middle to its ends.

I prefer to specify a sealing ring profile of variable thickness of cross-section as shown in Fig. 4 in contrast to a constant thickness profile shown in Fig. 3. The reason for this preference will become apparent when the functioning of the elastic sealing ring is examined more closely. On the one hand it is desirable that the sealing edges of the ring be narrow in order that the pressure exerted by them upon the sealing corners of the chamber be high. On the other hand, it is imperative that the sealing ring, although having a deformable cross-section, be sufficiently stable as an arch to sustain the fluid pressure forces without the danger of collapse by caving out in the direction of the fluid pressure.

The profile shown in Fig. 4 satisfies these somewhat contradictory requirements in that it has a cross-section of variable thickness, tapering from the maximum at the middle to sharp corner edges. This profile has the property of diminishing stiffness from its axis of symmetry to the edges and constitutes very nearly the ideal profile shape for an elastic sealing ring of my invention.

The operation of this device is simple. When pressure is applied to the interior 7 of the conduit, the pressure leaks through joint-line 11 and is applied against the convex face of sealing ring 10. Sealing ring 10 then tends to become cylindrical and in doing so applies pressure against the corners of the peripheral grooves 8 and 9. The greater the pressure applied against its convex surface, the greater the bearing loads will be between the edges of the sealing ring in the corners of the seal chamber.

To those skilled in the art it will be apparent that I take advantage in the configuration of the sealing ring with respect to the sealing chamber of the known and appreciated principles of mechanics, viz., the lever toggle, by which very large forces and small motions can be produced by very small forces and large motions. Accordingly in my invention the elastic deformation of the sealing ring profile caused by the fluid pressure exerts very large bearing forces on the edges of the sealing ring, thereby sealing off the pressure of the fluid. This effect is bound to be small in small diameters of sealing rings, but my invention concerns principally the sealing of flanges of large diameters. In the latter case the hoop tensions in the sealing ring are large and the peripherally restraining effect on the sealing ring is then small, and arcuate deflection of the sealing ring profile is great.

I found that this simple seal is ideally adapted for use in sealing interior cavities of gas turbines against the pressure of gases of high temperatures. The sealing of flanges of vessels operating under these conditions is one of the most difficult problems encountered in engineering. It is the purpose of my invention in particular to achieve a solution of this problem.

I wish to point out, however, that the seal of my invention may be utilized by those skilled in the art anywhere it is desired to seal against leakage of fluids under high pressure and at high temperature because no known gaskets and gasket materials can seal under these severe conditions.

I claim:

1. A sealing device comprising abutting members defining a conduit, each of said members having an annular groove therein, two of the surfaces forming said groove joining to form an annular corner, said grooves registering to form an annular chamber of symmetrical cross-section between the interior of said conduit and the exterior thereof, an elastic ring arched across said chamber in space, the edges of said ring contacting and exerting pressure only against opposite corners of said groove, the material of said ring being such as to tend to straighten out under pressure and to resist reversal of curvature under said pressure, said elastic ring being convex toward the highest pressure side of said conduit.

2. Apparatus in accordance with claim 1 wherein the edges of said ring exerting pressure against said corners are sharply rounded to contact both surfaces forming said corners at said corners.

3. Apparatus in accordance with claim 1 wherein said ring has a constant thickness profile.

4. Apparatus in accordance with claim 1 wherein said ring has a variable thickness profile having maximum thickness at the middle thereof.

5. Apparatus in accordance with claim 1 wherein the edges of said ring exerting pressure against said corners are sharply rounded to contact both surfaces forming said corners at said corners, and wherein said ring has a constant thickness profile.

6. Apparatus in accordance with claim 1 wherein the edges of said ring exerting pressure against said corners are sharply rounded and wherein said ring has a variable thickness profile having maximum thickness at the middle thereof.

7. Apparatus in accordance with claim 1 wherein the surface of said grooves over the convexity of said ring is curved in section, and wherein the opposite surface of said grooves is straight in section.

8. Apparatus in accordance with claim 1 wherein the surface of said grooves over the convexity of said ring is curved in section to form a pressure chamber over the convexity of said ring of substantially uniform depth across said ring, and wherein the opposite surface of said grooves is straight in section, said two surfaces in each groove meeting to form said corner.

9. Apparatus in accordance with claim 1 wherein the surface of said grooves over the convexity of said ring is curved in section to form a pressure chamber over the convexity of said ring of substantially uniform depth across said ring, and wherein the opposite surface of said grooves is straight in section, said two surfaces in each groove meeting to form said corner, the two straight surfaces being joined at an acute angle when said grooves are registered.

10. A sealing device comprising abutting members defining a conduit, each of said members having a concave groove therein, said grooves being registered to form an annular chamber between the interior of said conduit and the exterior thereof, an annular sealing ring arched across and dividing said chamber with the edges only of said ring contacting opposite walls of said grooves, in stable relationship thereto, said ring being convex to the highest pressure side of said chamber, whereby pressure against said ring tends to straighten the arch of said ring and thereby exerting sealing pressures between the edges of said ring and the groove walls contacted thereby.

11. Apparatus in accordance with claim 10 wherein the walls of said grooves contacted by said edges are shaped to form an angular corner and wherein the edges of said ring are shaped to contact said walls on both sides of the corner adjacent the corner.

12. Apparatus in accordance with claim 10 wherein the walls of said grooves contacted by said edges are shaped to form an angular corner and wherein the edges of said ring are rounded to contact said walls on both sides of the corner adjacent the corner.

DANIEL F. EGGER.